(12) United States Patent
Summer

(10) Patent No.: US 8,392,243 B2
(45) Date of Patent: Mar. 5, 2013

(54) INTEGRATED POS COMPUTER SYSTEM

(75) Inventor: Justin A. Summer, Tierra Verde, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1687 days.

(21) Appl. No.: 11/481,984

(22) Filed: Jul. 7, 2006

(65) Prior Publication Data

US 2007/0083430 A1   Apr. 12, 2007

Related U.S. Application Data

(60) Provisional application No. 60/725,325, filed on Oct. 12, 2005.

(51) Int. Cl.
*G06Q 30/00* (2012.01)
(52) U.S. Cl. ......................................................... 705/14
(58) Field of Classification Search .................. None
See application file for complete search history.

(56) References Cited

U.S. PATENT DOCUMENTS

| | | | |
|---|---|---|---|
| 5,832,457 A | | 11/1998 | O'Brien et al. |
| 5,923,016 A | * | 7/1999 | Fredregill et al. ............. 235/380 |
| 6,142,371 A | * | 11/2000 | Oneda ........................... 235/380 |
| 7,390,264 B2 | * | 6/2008 | Walker et al. ................... 463/42 |
| 7,398,225 B2 | * | 7/2008 | Voltmer et al. ................. 705/14 |
| 2003/0220834 A1 | | 11/2003 | Leung et al. |

OTHER PUBLICATIONS

Written Opinion of the International Search Authority PCT/US2006/026314.

* cited by examiner

*Primary Examiner* — Colleen Hoar
(74) *Attorney, Agent, or Firm* — Pillsbury Winthrop Shaw Pittman LLP

(57) ABSTRACT

A POS CS includes an additional logical control logging of transaction data, transmission of the transaction data to a central CS, identification of CIDs in transactions qualifying for marketing information, and instruction of printers for printing the marketing information for a CID during a transaction involving the CID at a terminal in the POS CS.

7 Claims, 2 Drawing Sheets

INTEGRATED POS COMPUTER SYSTEM

CROSS REFERENCE TO RELATED APPLICATIONS

This application claims priority to U.S. provisional application 60/725,325, filed Oct. 12, 2005, title "Integrated POS Computer System."

FIELD OF THE INVENTION

This invention relates to the fields of POS systems and POS marketing.

BACKGROUND OF THE INVENTION

Point Of Sale ("POS") Computer Systems (CSs) log transaction data for transactions occurring at a POS.

U.S. Pat. No. 5,832,457 to O'Brien et al. discloses a POS CS including two distinct network segments.

A first network segment includes store controller digital computer 10 for logging transaction data, POS terminals 12 each including bar code scanners 13, and a first network segment communication line 16 enabling communication between the terminals and store controller 10. Preferably, the store controller updates the item record file 14 thereby tracking store inventory. The store controller may be programmed to perform additional accounting and analysis functions. In addition, but not shown, each POS terminal of the first network segment also includes a printer.

A second network segment includes a second digital computer 20, printers 28, and a second network segment communication line 26. Each printer 1 of the second network segment is located at one POS such that there are corresponding printers 28 and POS terminals 12. Second digital computer 20 stores transaction data in customer purchase file 22 and criteria and marketing information data in checkout direct database 24.

The POS CS also includes a network communication line 21 that connects the first network segment communication line 16 to the second computer 20.

The POS CS also includes a network communication line 32 between the second computer 20 and a host or central CS 30.

In operation, O'Brien et al.'s second computer 20 receives over communication line 21 transaction data for transactions occurring in the POS CS, interacts over network connection line 32 with central CS 30 to provide to the central CS 30 transaction data and receive from central CS 30 instructions including criteria for providing targeted marketing communications to consumers and content of targeted marketing communications, and instructs printers 28 to print targeted marketing information when criteria are met by a transaction at the corresponding POS terminals.

Second digital computer 20 identifies when customers are at a POS by reading from transaction data on network communication line 21 POS terminal ID and Customer IDentification ("CID") and retrieving data indicating which of printers 28 is located at that POS terminal. Second digital computer 20 determines what marketing information to provide to that CID by for example determining if transaction data associated with the CID meets criteria previously received by second digital computer 20 from central CS 30.

The hardware and network configuration disclosed in the O'Brien et al. patent as just described with minor variations has been installed in thousands of retail stores.

SUMMARY OF THE INVENTION

The invention provides a novel POS CS to enable the POS marketing functions provided by the O'Brien patent without requiring the elements of the second network segment noted above. The novel POS CS includes (1) a network connection from store controller computer 10 to a remote computer 30, and (2) either (2a) a store controller computer 10 that includes an additional logical unit or (2b) one or more printers that each include an additional logical unit and structure to network communicate with the store controller computer 10. All of the embodiments moot the second network segment line 26 and printers 28 described above.

In one aspect, we provide a POS CS and method of using it wherein the system comprises at least one terminal including a scanner reading transaction data and a printer for printing at least transaction information; store controller computer for reading data, performing logical operations, and storing data; an additional logical unit for reading data, performing logical operations, and storing data; at least one communication link enabling said store controller computer, said at least one terminal, and said additional logical unit to communicate with one another; an item record file controlled by said store controller computer; a customer purchase file controlled by said additional logical unit; an incentive offer file including CIDs, and for at least some of said CIDs, associated marketing information, and wherein said incentive offer file controlled by said additional logical unit.

In a first embodiment, the novel POS CS includes an additional logical unit, such as a novel PC board installed on a mother board of the store controller computer. The novel PC board has access thereby to the data on the system bus of the store controller of the POS CS. The novel PC board includes a processor, memory, and code enabling it to read and store transaction data from the POS terminals of the POS CS and to perform the marketing functions noted above for the O'Brien et al. patent. A benefit of the first embodiment is that the PC board has access to data flow on the local network regardless of the configuration of the local network. In the first embodiment, central CS 30 can transmit data to the store controller 10 instead of to the prior art second computer system 20, and the store controller 10 can transmit data, such as transaction data for transactions that occurred at the POS terminal, to the central CS 30.

In a second embodiment of a novel POS CS, the POS CS includes the additional logical unit in a printer associated with the same network node as a POS terminal of the novel POS CS. The additional logical unit in the printer includes a processor, memory, and code enabling it to read and store in its memory transaction data from its POS terminal and to perform the marketing functions noted above for the O'Brien POS CS with respect to its POS terminal. Each POS terminal may include a printer having the foregoing additional logical unit. In the second embodiment, central CS 30 can transmit data to the logical unit in the printer, and the logical unit in the printer can transmit data to the central CS 30, such as transaction data for transactions that occurred at the POS terminal.

Graphical marketing material requiring large amounts of data storage may reside locally in memory in the printer, and be added to marketing material in response to certain marketing material print instructions, and thereby reduce local network traffic.

In a third embodiment, a novel POS CS is structured so that a printer unit that is part of one POS terminal includes the additional logical unit that can perform marketing functions for all POS terminals of the POS CS. In this third embodiment, the printer unit and POS CS are structured so that the printer unit has access to transaction data transmitted from other POS terminals of that POS CS. In addition the POS terminal that includes the additional logical unit performs the functions of analyzing transaction data for occurring transactions from other POS terminals and instructing the printers at the other POS terminals regarding printing of marketing information, including purchase incentive offers.

A benefit of the third embodiment is that all transaction data obtained by the POS CS is aggregated in a database controlled by additional logical unit so that the central CS need only communicate with the one CPU to obtain log data for that POS CS.

A benefit of all of the foregoing embodiments is that they do not require the second network segment and hardware of the second network segment noted above in the O'Brien et al. patent.

All embodiments may store transaction data in one or more database files located at one or more nodes of the POS CS, such as in memory controlled by the store controller or processors at any one of the POSs.

In all embodiments, the additional logical unit my apply criteria to purchase transaction data for previous transactions to determine consumer identifications (CIDs) that qualify for marketing incentive offers (such as coupons), store the CID in association with the marketing incentive. In addition, code executed on the additional logical unit may compare CID that transmitted in response to transactions to recognized when a CID an associated marketing incentive appears, and respond by transmitting print instructions to print at a printer adjacent to the POS from which the CID was read. In addition, code executed by the additional logical unit may initiate an upload of stored transaction data from the POS CS to the central CS 30. In addition, the central CS 30 may run code to generate lists of CIDs having associated marketing incentive offers (such as coupons) from transaction data it receives from the POS CS, as well as many other POS CSs, and then download the lists of CIDs having associated marketing incentive offers to the POS CS from which the CIDs were received.

Alternatively to network communication between components of the novel POS CS and the central CS, the novel POS CS may be designed to include and use a removable memory media device for transmission of transaction data to the central CS and receipt of (1) changes to marketing software and (2) marketing instructions data from the central CS. That is, in instances where the novel POS CS may not have network connection to the central CS, data and code may be transmitted via courier between the POS CS and the central CS to effect targeted marketing using the novel POS CS.

The novel POS CS preferably includes wireless network communications technology so that it can transmit and receive the data and instructions noted herein above.

Preferably, the PC boards noted housing the additional logical unit designed to connect into a conventional slot of a printer or PC, such as a PCI slot, but alternatively it could be a unit connecting via a PCMCIA slot, or a USB port. The logic and instructions (code) stored thereon are programmed to interact with the OS of the POS CS to store in the memory on the board or in system memory allocated by the OS to the additional logical unit transaction data for transactions occurring at the POSs of a retail store whose transactions are logged by the novel POS CS and trigger criteria and corresponding marketing communications.

An important point of the foregoing embodiments is the existence of a central CS that performs marketing analysis on the transaction data to generate therefrom marketing information trigger criteria, corresponding marketing information, and a corresponding CID. The central CS transmits that corresponding information back to the novel POS CS so that the POS CS can be used to transmit the marketing information to a consumer when the consumer's CID is read at a POS terminal of the POS CS and the consumer transaction data meet the associated trigger criteria.

Another aspect of the foregoing inventions is the communication protocols and attendant hardware and software complications and system stability. In that regard, the inventors conceive of a preferred embodiment in which each additional logical unit includes ethernet hardware such that it appears to the local network as a network node communicating via TCP/IP. Inclusion of a high level interface, such as ethernet, to the additional logical unit, moots complications and variations between operating systems of interacting with data flow at low levels of formatting.

Embodiments of the additional logical unit my include for example one or more CPUs, RAM, and virtual disk drives implemented for example with FLASH memory, and even on board actual (spinning drives), and network interface card structure interfacing data transmitted between the additional logical unit and other network nodes.

BRIEF DESCRIPTION OF THE DRAWINGS

FIG. 2 shows system 50 including central CS 30 and store controller computer 10, and additional logical unit 100. Lines 110, 120 indicate that logical unit 100 may reside in store controller 10 (first embodiment), in terminal N (second embodiment), or that separate logical units exist in a plurality of the terminals 1, . . . N. Customer purchase file 22 stores transaction data for consumer transactions, and it may be controlled or accessed by either or both of the store controller and the additional logical units. Central CS 30 and store controller 10 preferably have a data communications link 130, which may be a packet switched network link, such as the Internet, over which they can communicate. Checkout direct database 24 is accessible by logical unit 100. Checkout direct database 24 stores in association with CIDs information (such as marketing incentive offers) for distribution to consumers using those CIDs at the terminals 1, . . . N, via printing on the printers located with the terminal at which the consumer is located during a transaction.

Figure 1:
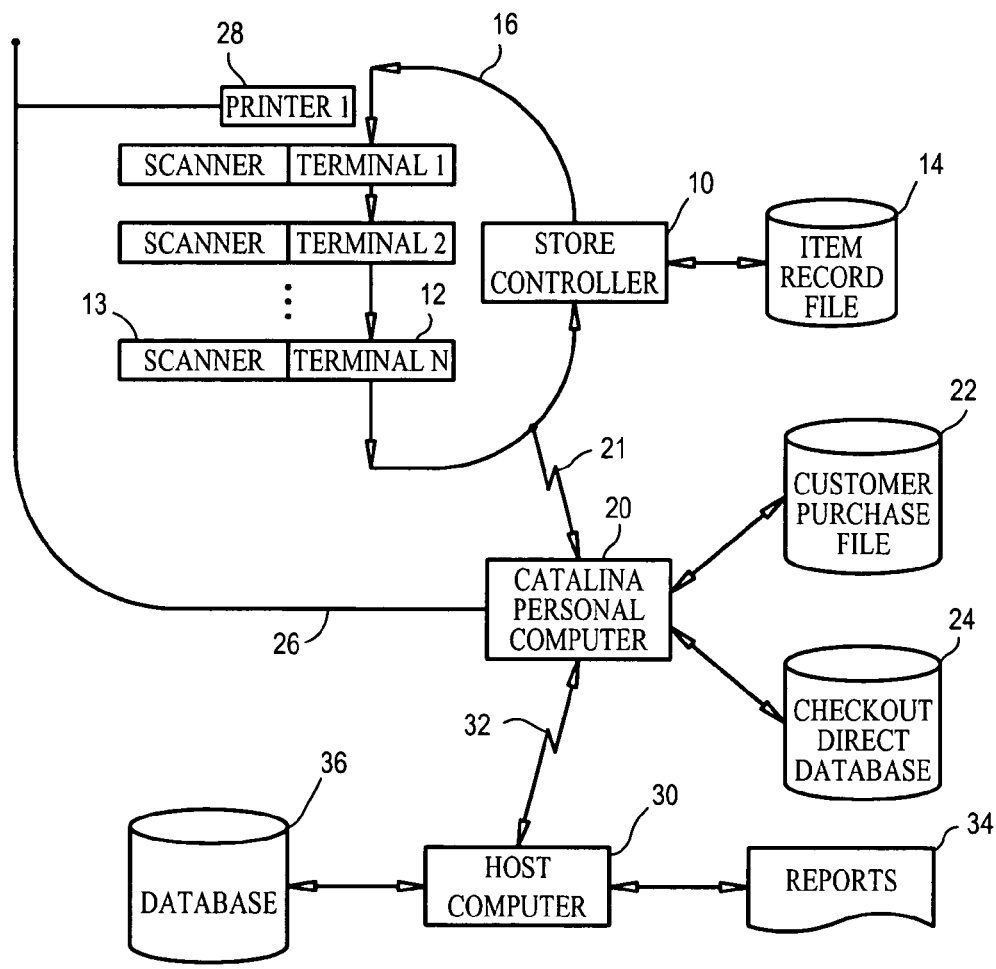
FIG. 1 show the prior art system of U.S. Pat. No. 5,832,457 to O'Brien, which includes two distinct network segments.
Figure 2:
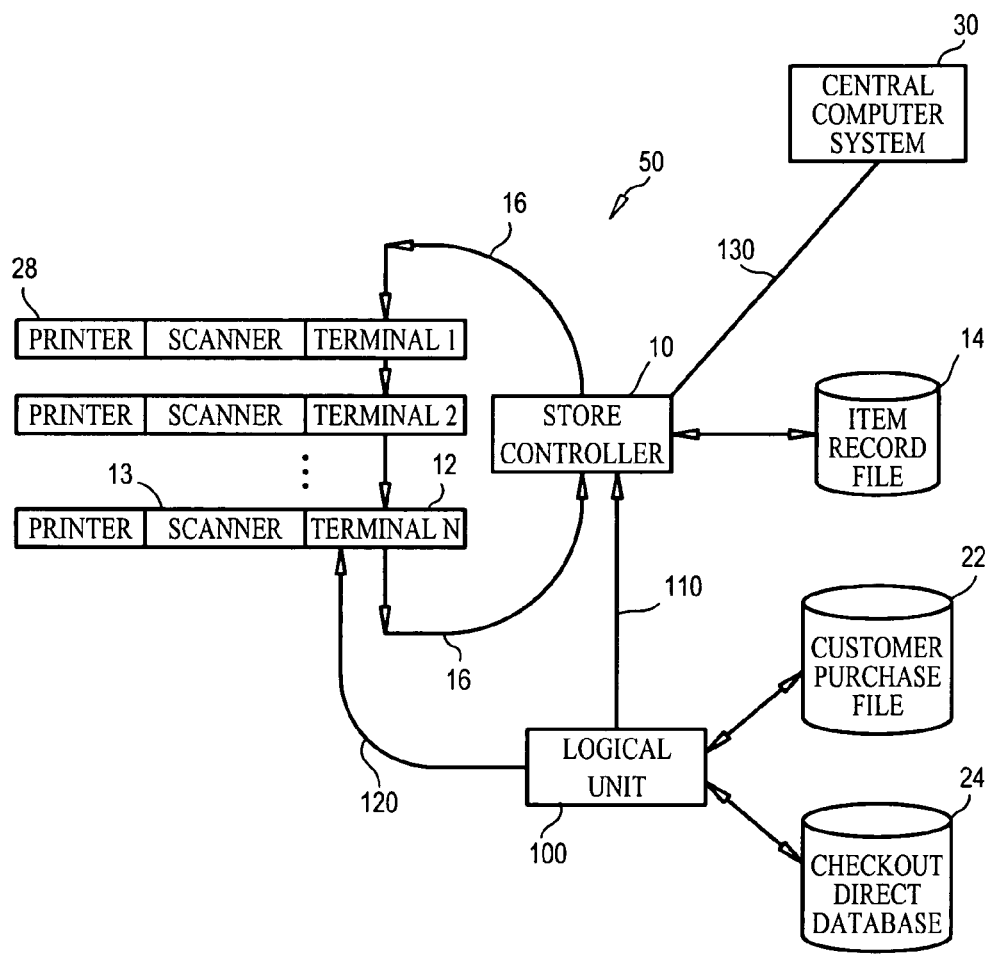
FIG. 2 shows a novel system 50 of this application having only one network segment in the POS CS and an additional logical unit 100 in that network segment.

The invention claimed is:

1. A Point of Sale (POS) Computer System (CS), comprising:
    at least one terminal including a scanner for reading transaction data and a printer for printing at least transaction information;
    a store controller computer for reading data, performing logical operations, and storing data;
    an additional logical unit for reading data, performing logical operations, and storing data;
    at least one communication link enabling said store controller computer, said at least one terminal, and said additional logical unit to communicate with one another;
    an item record file controlled by said store controller computer;
    a customer purchase file controlled by said additional logical unit;

an incentive offer file including Customer IDs (CIDs), and for at least some of said CIDs, associated marketing information, said incentive offer file controlled by said additional logical unit; and wherein said POS CS does not include a linked host CS.

2. A network Computer System (CS), comprising:

(i) a Point of Sale (POS) Computer System (CS), wherein the POS CS includes:

at least one terminal including a scanner for reading transaction data and a printer for printing at least transaction information;

a store controller computer for reading data, performing logical operations, and storing data;

an additional logical unit for reading data, performing logical operations, and storing data;

at least one communication link enabling said store controller computer, said at least one terminal, and said additional logical unit to communicate with one another;

an item record file controlled by said store controller computer;

a customer purchase file controlled by said additional logical unit;

an incentive offer file including Customer IDs (CIDs), and for at least some of said CIDs, associated marketing information, said incentive offer file controlled by said additional logical unit; and wherein said store controller computer has a system bus, and said additional logical unit logically connects to said system bus;

(ii) a central CS; and (iii) a network link between said POS CS and said central CS; and wherein said additional logical unit is configured to transmit contents of said customer purchase file to said central CS, said central CS is configured to generate from said contents of said customer purchase file a list of CIDs and associated marketing information, and to transmit said list of CIDs and associated marketing information to said additional logical unit.

3. The network CS of claim 2, wherein said additional logical unit includes ethernet hardware such that it appears to the local network as a network node communicating via TCP/IP.

4. A Point of Sale (POS) Computer System (CS), comprising:

at least one terminal including a scanner for reading transaction data and a printer for printing at least transaction information;

a store controller computer for reading data, performing logical operations, and storing data;

an additional logical unit for reading data, performing logical operations, and storing data;

at least one communication link enabling said store controller computer, said at least one terminal, and said additional logical unit to communicate with one another;

an item record file controlled by said store controller computer;

a customer purchase file controlled by said additional logical unit; and an incentive offer file including Customer IDs (CIDs), and for at least some of said CIDs, associated marketing information, said incentive offer file controlled by said additional logical unit; and wherein a first one of said at least one terminal has a first network address and said additional logical unit has said first network address, and further comprising additional logical units each of which is located at a different one of said at least one terminal, and each of which has a different logical address.

5. A method of using a Point of Sale (POS) Computer System (CS), comprising:

providing at least one terminal including a scanner for reading transaction data and a printer for printing at least transaction information;

providing a store controller computer for reading data, performing logical operations, and storing data;

providing an additional logical unit for reading data, performing logical operations, and storing data;

providing at least one communication link enabling said store controller computer, said at least one terminal, and said additional logical unit to communicate with one another;

controlling an item record file with said store controller computer;

controlling a customer purchase file with said additional logical unit;

including in an incentive offer file Customer IDs (CIDs), and for at least some of said CIDs, associated marketing information;

controlling said incentive offer file with said additional logical unit; and wherein said POS CS does not include a linked host CS.

6. A method of using a Point of Sale (POS) Computer System (CS), comprising:

providing at least one terminal including a scanner for reading transaction data and a printer for printing at least transaction information;

providing a store controller computer for reading data, performing logical operations, and storing data;

providing an additional logical unit for reading data, performing logical operations, and storing data, wherein said additional logical unit includes ethernet hardware such that it appears to a local network as a network node communicating via TCP/IP, and wherein said store controller computer has a system bus, and said additional logical unit logically connects to said system bus;

providing at least one communication link enabling said store controller computer, said at least one terminal, and said additional logical unit to communicate with one another;

controlling an item record file with said store controller computer;

controlling a customer purchase file with said additional logical unit;

including in an incentive offer file Customer IDs (CIDs), and for at least some of said CIDs, associated marketing information;

controlling said incentive offer file with said additional logical unit;

linking a central CS to said POS CS with a network communications link; and transmitting from said additional logical unit contents of said customer purchase file to said central CS, generating at said central CS from said contents of said customer purchase file a list of CIDs and associated marketing information, and transmitting from said central CS said list of CIDs and associated marketing information to said additional logical unit.

7. A method of using a Point of Sale (POS) Computer System (CS), comprising:

providing at least one terminal including a scanner for reading transaction data and a printer for printing at least transaction information;

providing a store controller computer for reading data, performing logical operations, and storing data;

providing an additional logical unit for reading data, performing logical operations, and storing data;

providing at least one communication link enabling said store controller computer, said at least one terminal, and said additional logical unit to communicate with one another;

controlling an item record file with said store controller computer;

controlling a customer purchase file with said additional logical unit;

including in an incentive offer file Customer IDs (CIDs), and for at least some of said CIDs, associated marketing information;

controlling said incentive offer file with said additional logical unit; and wherein a first one of said at least one terminal has a first network address and said additional logical unit has said first network address, and further comprising additional logical units each of which is located at a different one of said at least one terminal, and each of which has a different logical address.

* * * * *